T. O. HARSTAD.
SHIELD FOR CORN CULTIVATORS.
APPLICATION FILED DEC. 3, 1917.
1,268,117.
Patented June 4, 1918.
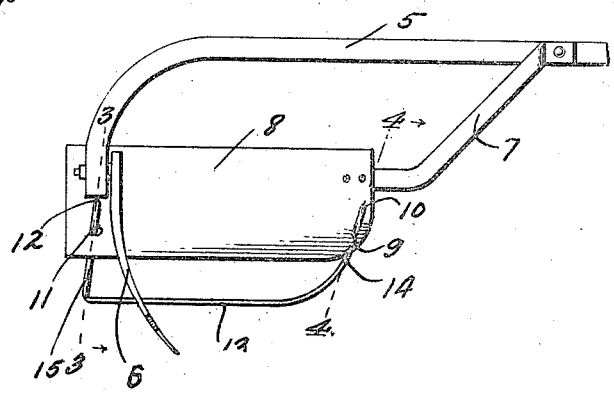
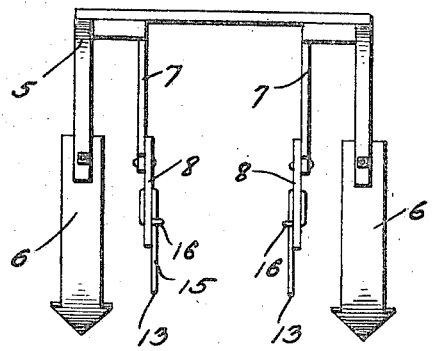
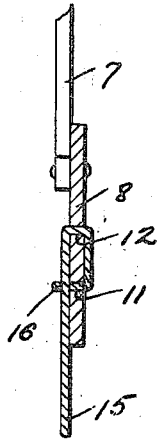
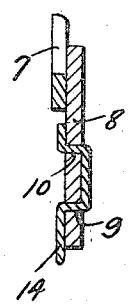
Witnesses
Inventor
T. O. Harstad
By
Attorneys

UNITED STATES PATENT OFFICE.

THOMAS O. HARSTAD, OF WINDOM, MINNESOTA.

SHIELD FOR CORN-CULTIVATORS.

1,268,117.

Specification of Letters Patent.

Patented June 4, 1918.

Application filed December 3, 1917. Serial No. 205,126.

*To all whom it may concern:*

Be it known that I, THOMAS O. HARSTAD, a citizen of the United States, residing at Windom, in the county of Cottonwood, State of Minnesota, have invented certain new and useful Improvements in Shields for Corn-Cultivators; and I do hereby declare the following to be a full, clear, and exact description of the invention, such as will enable others skilled in the art to which it appertains to make and use the same.

This invention is an improvement in agricultural machines and has particular reference to a shield for cultivators.

An object of the invention is to provide an improved means for attaching a runner to a cultivator shield whereby the bottom thereof will be spaced from the ground to permit of loose and fine earth being thrown, by the shovels of the cultivator, beneath the shield and around the stalks of corn or the like.

Another object is to provide a shield of this character which is simple in construction, easy to manufacture and effective in carrying out the purpose for which it is designed.

The inventive idea involved is capable of receiving a variety of mechanical expressions one of which, for the purpose of illustrating the invention is shown in the accompanying drawing, wherein:—

Figure 1 is a fragmentary side elevation of the cultivator showing the shield applied thereto and constructed in accordance with the invention.

Fig. 2 is a rear elevation thereof.

Fig. 3 is a section on the line 3—3 of Fig. 1.

Fig. 4 is a section on the line 4—4 of Fig. 1.

In the drawing, the numeral 5 indicates a cultivator beam to which is secured in the ordinary manner the shovels 6. Connected to the beam are the shield supporting arms 7 disposed in a downwardly inclined position and secured at their lower ends to the shields 8 disposed in a vertical position and adjacent the inner sides of the shovels 6 so that a row of plants may pass therebetween.

Each shield 8 is preferably constructed in a substantially similar manner to those now employed and for the purposes of the present invention the same is provided at the forward end and adjacent the beam edge thereof with spaced openings 9 and 10. The shield is also provided adjacent its rear end and bottom edge with the vertically alined openings 11 and 12. In order to space the bottom edge of the shield from the ground to permit of loose dirt passing thereunder by the action of the shovels 6, a runner 13 is preferably provided and consists of an elongated rod having its forward end 14 curved upwardly and is extended through the opening 9 in the forward end of the shield. The extremity of said end is then passed through the opening 10 in an opposite direction so that said extremity will bind in said openings to retain the intermediate portion of the runner in spaced and parallel relation with the bottom edge of the shield. The rear end 15 of the runner is preferably bent at substantially right angles to the intermediate portion thereof and its extremity is first passed through the upper opening 12 from one side of the shield and then bent to extend downwardly on the other side of the shield where the same is bent and passed through the opening 11 and provided with a loop 16 which is coiled about that portion of the rod adjacent said opening 11 thereby securing the rod to the shield in such a manner as to prevent relative movement therebetween.

It will thus be apparent from the foregoing deescription that as the cultivator is operated with two of the shovels and shields passing on each side of a row of plants, the loose and fine dirt thrown by the shovels toward the shields will pass beneath the lower edges of the latter and be deposited around the base of the plants.

What is claimed is:—

1. In a cultivator, the combination with a shovel, of a shield disposed adjacent thereto and having openings adjacent the forward and rear ends thereof, and a runner having its forward end extended through the openings in the forward end of the shield whereby said end of the runner will bind against the edges of said openings, the rear end of said runner being passed through one of the openings adjacent the rear end of the shield and then extended through the other adjacent opening and having its extremity bent about the runner adjacent the last named opening.

2. A cultivator shield having openings adjacent the front and rear ends thereof, a runner having its forward end secured in the openings at the front of said shield, and its intermediate portion spaced from the bottom thereof, the rear end of said runner being extended through one of the openings at the rear end of the shield from one side thereof and then projecting along the other side and extended through the other adjacent opening, the extremity of the runner being bent to provide a loop for encircling the portion thereof adjacent the last named opening.

In testimony whereof, I affix my signature in the presence of two witnesses.

THOMAS O. HARSTAD.

Witnesses:
LEROY C. PIETZ,
H. T. ANDERSON.

Copies of this patent may be obtained for five cents each, by addressing the "Commissioner of Patents, Washington, D. C."